Figure 1:
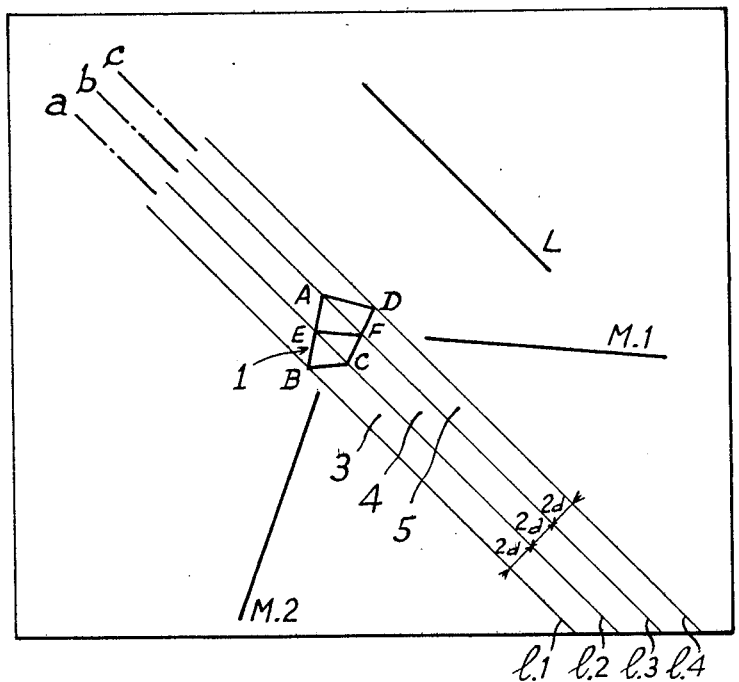

United States Patent

Pollard et al.

[11] 4,081,791
[45] Mar. 28, 1978

[54] METHODS AND APPARATUS FOR MAKING WRITING LEGIBLE BY A MACHINE FOR RECOGNIZING SHAPES

[76] Inventors: Jean Pollard, 27 rue du Parc a Foulon, 91120 Villebon S/Yvette; Pierre Pollard, 15 rue E. Voisin, 94340 Joinville le Pont, both of France

[21] Appl. No.: 669,618

[22] Filed: Mar. 23, 1976

[30] Foreign Application Priority Data

Mar. 26, 1975 France .................................. 75 09521

[51] Int. Cl.² .............................................. G06K 9/18
[52] U.S. Cl. ............................. 340/146.3 A; 235/487; 340/146.3 Z; 340/146.3 Y
[58] Field of Search ................. 235/61.12 R, 61.12 N, 235/61.11 E; 340/146.3 A, 146.3 Z, 146.3 J, 146.3 D, 146.3 Y, 146.3 F; 117/33.3

[56] References Cited

U.S. PATENT DOCUMENTS

| 2,937,283 | 5/1960 | Oliver | 340/146.3 F |
| 2,963,220 | 12/1960 | Kosten et al. | 235/61.12 R |
| 3,011,905 | 12/1961 | Newman | 117/33.3 |
| 3,381,274 | 4/1968 | Quade et al. | 340/146.3 Y |
| 3,485,168 | 12/1969 | Martinson | 340/146.3 A |
| 3,559,170 | 1/1971 | Barnes | 340/146.3 Z |
| 3,731,276 | 5/1973 | Rayfield | 340/146.3 Z |
| 3,733,468 | 5/1973 | Eberly | 340/146.3 A |
| 3,786,237 | 1/1974 | Postal | 235/61.11 E |

*Primary Examiner*—Leo H. Boudreau
*Attorney, Agent, or Firm*—Brumbaugh, Graves, Donohue & Raymond

[57] ABSTRACT

A support element is disclosed for conveying encoded information, such as arabic numerals, formed of detectable material in presentable form for automatic decoding. The support surface is characterized by one or more information displays each of which is patterned from a pair of adjacent quadrilaterals preferably joined along a common segment to form a grid, each display being characterized by the detectable material overlying selected grid segments. A plurality of displays may be aligned on the support one behind the other such that corresponding grid segments from a pair of adjacent displays are inscribed within one of three parallel grid sampling channels delimiting all the segments of at least one grid. Automatic detection of the encoded numerals is accomplished by traversing the displays with a suitable sensor in one direction within the boundaries of each of the sampling channels. Where the displays are to be hand written the detectable material may be provided by preprinted or impressed supports. Ordinary writing devices may be used for marking the selected grid segments to encode the displays.

18 Claims, 8 Drawing Figures

METHODS AND APPARATUS FOR MAKING WRITING LEGIBLE BY A MACHINE FOR RECOGNIZING SHAPES

The present invention relates to making writing legible by a simple machine for recognizing shapes, preferably when this writing is hand writing Characters comprising seven segments are known, in particular those which appear in a luminous manner on the digital displays of certain miniaturized calculators.

Also during the transcription by operators of the postal code into a legible language by a machine for recognizing shapes, the use of optically active materials able to be detected by reading heads is known. Also, during the coded transcription of cheque numbers in order that the latter may be identified by a machine for recognizing shapes, the use of magnetically active materials able to be detected by reading heads is known. But these methods do not facilitate reading of hand writing, since the machine programme for recognizing shapes is established for characters of well defined configuration transcribed by the operator and not for the extremely varied and changing characters of hand writing.

The object of the present invention is therefore to make hand writing perfectly legible by a machine, without it being necessary to transcribe it into a language which can be assimilated by the latter. The use of such a machine makes it possible to eliminate a large number of expensive staff, to protect the staff present from the stresses of paying sustained attention, to obtain a high production speed and, finally to reduce the time lost in classification and investigations, thus minimizing the forwarding duration of documents (letters, cheques, invoices etc.).

The object of the present invention is also to simplify to the extreme, machines for recognizing shapes, which are used for this purpose. In the first place, this results in the investment costs being considerably reduced and in the second place, the machines may be multiplied in number and dispersed geographically, which facilitates instantaneous and de-centralized processing of information.

Attempts to make hand writing legible by relatively complex currently existing machines for recognizing shapes, have been undertaken.

They consisted of visualizing on the support, such as an envelope for example, a grid serving as a guide for the hand writing. By covering one or more segments of the grid, the writer was to reproduce the chosen numerical or alphanumerical character more or less faithfully. The covering took place either with special inks or with ordinary inks or graphites and the detection was carried out optically.

But these attempts were not crowned with success owing to the inability of the method to satisfy the requirements of the user and of the field of application (complexity and difficulty of apprenticeship, non-specificity of the characters, doubtful reproduceability of the latter upon detection etc.).

Furthermore, this method did not make it possible to simplify the treatment of automatic reading and to make this treatment reliable and economical, in particular owing to the inaccuracy of positioning of the characters with respect to the reading means of the machine and the particular construction of the chain of characters, a question which is explained in the body of the ensuing description.

The present invention proposes to achieve the aforementioned objectives, which the above-described attempts were unable to do. It achieves the latter by putting into concrete form:

A generic grid having a voluntary limited power of representation which comprises, by construction, topological properties translated as a particular aptitude for decoding and the simple drawing of which requires a minimum apprenticeship construction of chains of characters preserving and using the topological properties of the grid in an optimum manner; and means making it possible to materialise on these grids, characters which may be detected automatically in a reliable and economical manner.

The method consists of inscribing each character in a seven segment formed from a pair of adjacent quadrilaterals preferably joined along a common segment and carried by a document and having two main reference directions each of which is oblique to the single direction of automatic reading to be followed by an appropriate, for example, optical detector in traversing the grids. In the preferred embodiment the posture of the grids with respect to a reference direction of the document writing support which may be the longitudinal edge of this support, is such that the single direction of automatic reading permits reading of all the grid segments by moving the detector forwards in a single passage.

Advantageously, in a particular case, the reading direction is parallel to a diagonal of the elementary quadrilateral of each grid defined by four grid segments. Thus detection of all the segments of a grid may be obtained by scanning in each of three reading channels traversing the grid and defined by four straight lines parallel to the reading direction and passing through all the intersection points of the segments composing a well positioned grid. Detectors passing across the grid within each of these channels therefore traverse distinct sets of grid segments. Detectable grid segments which legibly define a character are thereby detected and representative signals are registered, in a known manner, for subsequent automatic counting. The relationship between the counts thus obtained and the individual characters inscribed on the grids is shown in Table I, below.

The method, as above-described, is viable whether the writing is hand writing or is typed, printed or reproduced by any other means.

In the case of hand writing applied to a support, such as an envelope, cheque, label, invoice or the like, whether this is a single support or a support covered with a transfer sheet, as is frequently the case in carboned pads, the method uses a chain of printed grids and, in addition, engraved in intaglio, a deposit of detectable material and a marker enabling the writer to follow the selected segments by pressing on the support.

In this case, according to the invention, the deposited detectable material is provided completely by the support, which makes it possible to guarantee the pre-produceability of the message. The writer traces each character of this message by following the corresponding segments of the grids with any tracer, in order that said message or its complement appears in detectable material on the existing part of the support.

Figure 2:
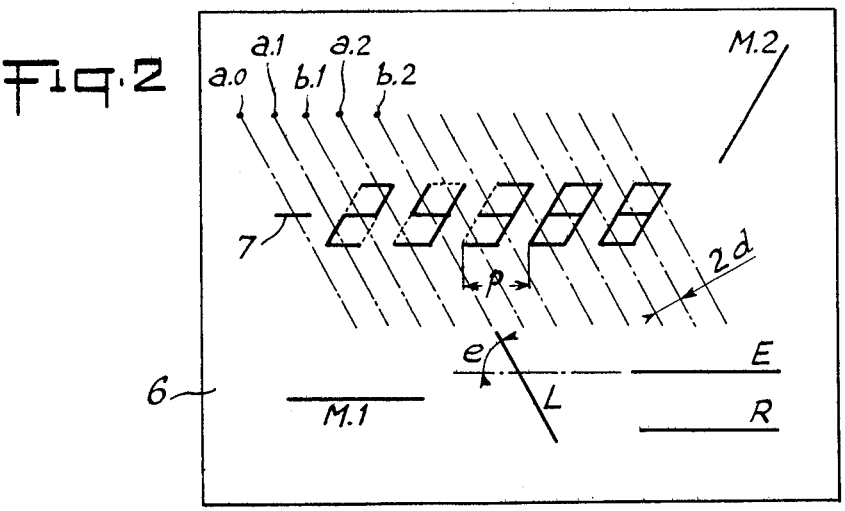
Figure 3:
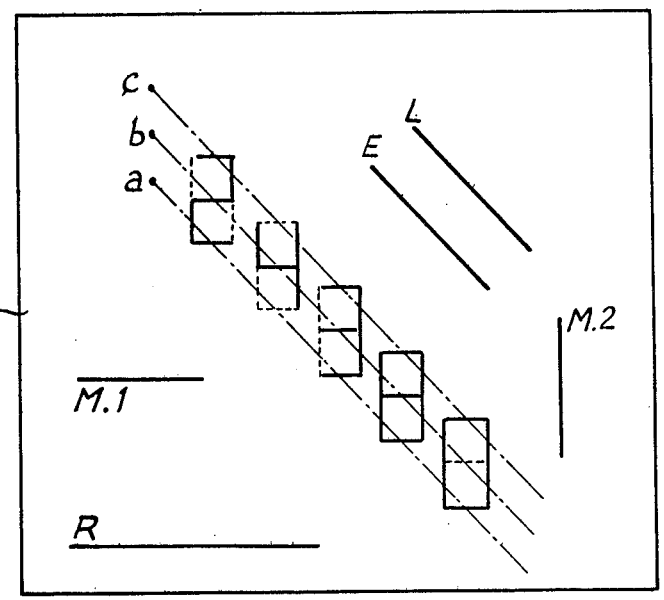
Figure 4:
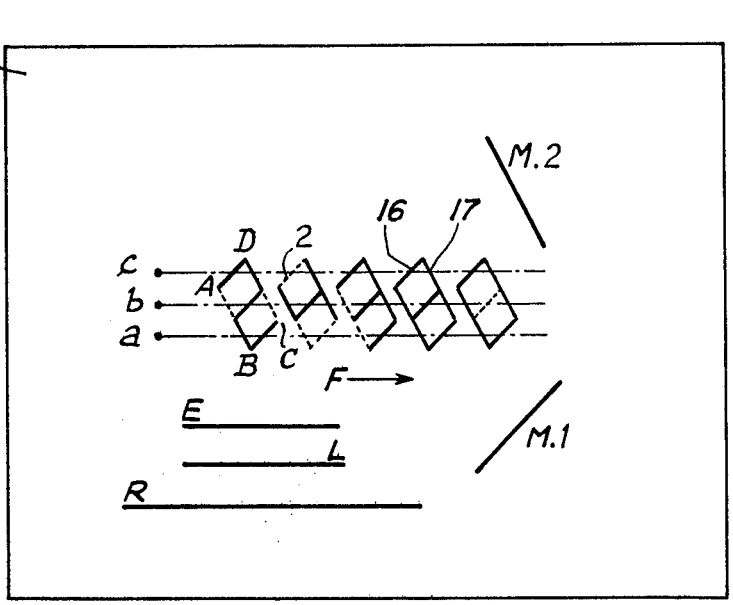
Figure 5:
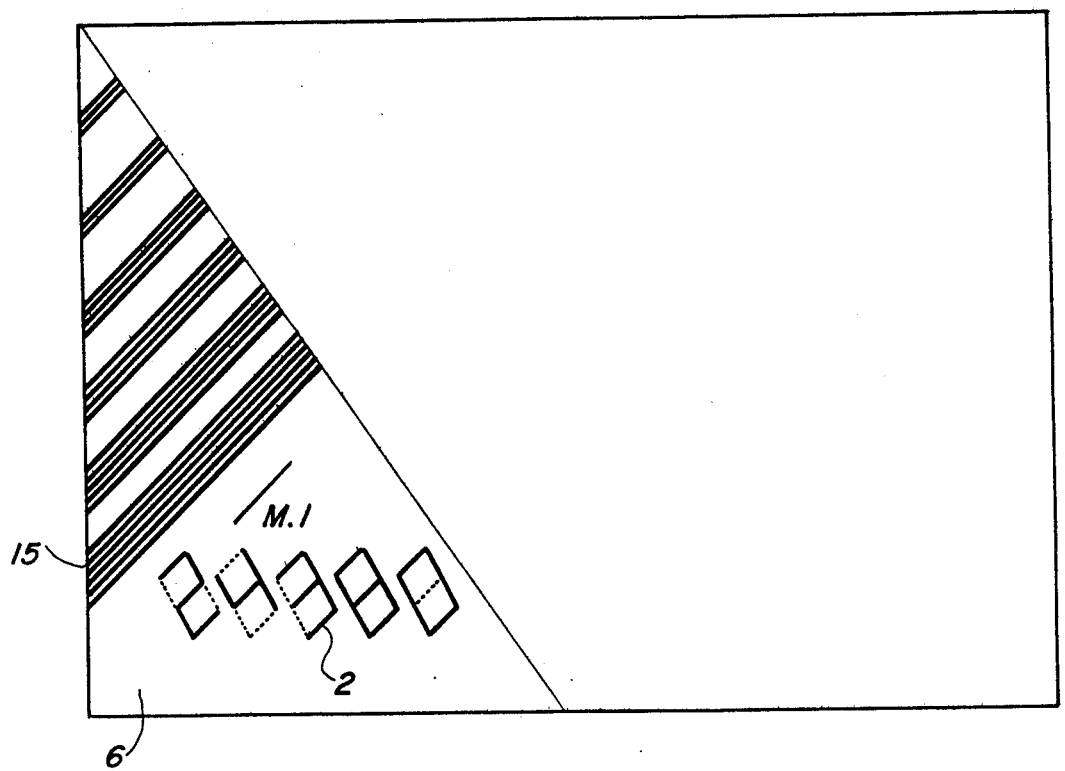
Figure 6:
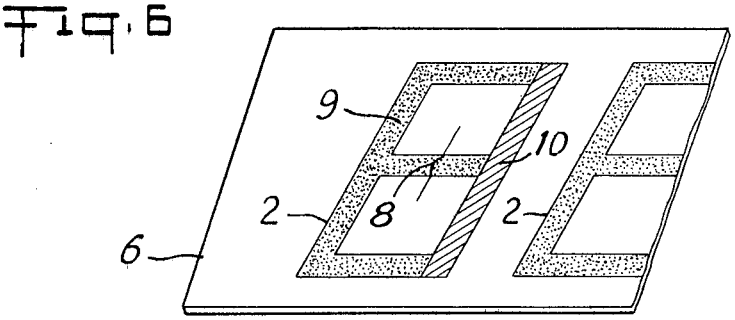
Figure 7:
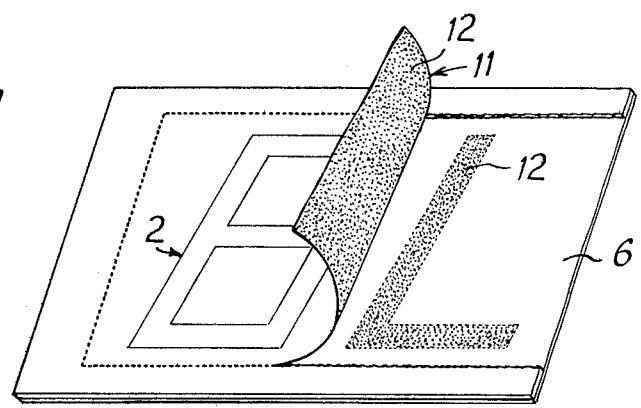
Figure 8:
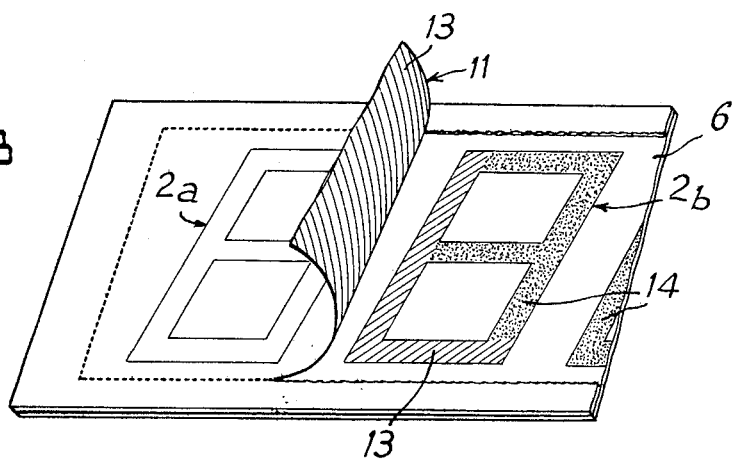

Various ways of carrying out the writing method proper and this method adapted to hand writing are described in detail hereafter and illustrated by the accompanying drawings, as non-limiting examples:

FIG. 1 is a diagram showng the generalized implementation of the said method, according to the invention, FIGS. 2 to 4 are views similar to FIG. 1, showing three particular ways of carrying out this method, FIG. 5 is a plan view showing an optical decoy consisting of a plurality of parallel lines printed on an envelope and facilitating the transcription of characters for the writer, by giving him the impression that they are upright, FIGS. 6 to 8 are diagrams illustrating three particular ways of carrying out the method of the invention, suitable when the transcription is hand written.

FIG. 1 shows a generic grid 1 which may be constructed in the following manner: four lines 1.1 to 1.4 are drawn parallel to a direction L and spaced apart by the distance 2d; convex quadrilateral ABCD is constructed on these four lines, by placing A on 1.3, B on 1.1, C on 1.2 and D on 1.4; the median line EF is drawn in by placing E on 1.2 and F on 1.3.

It will be seen that the geometric figure thus obtained is a grid 1 comprising seven segments AE, EB, BC, CF, FD, DA, EF.

As shown clearly in Table I, which is drawn up for a grid in the form of a parallelogram 2 (FIG. 6), this grid comprising seven segments makes it possible o represent appropriately, by selection of the segments, ten arabic numerals and some Latin letters.

In addition, due to its construction, it has the property according to which each segment is seen in the direction L which corresponds to the direction of automatic reading by a suitable detector (not shown), in a channel 3, 4 or 5 of width 2d (FIG. 1). Thus, the trajectory in this direction L of 3 points $a$, $b$, $c$ which together encounter all the segments of the grid may be defined with an accuracy of ± d. Henceforth, if the points $a$, $b$, $c$ represent, respectively a detection cell of a reading head moving in the direction L, the reading head may have a positioning uncertainty of ± d, which is substantially equal to 1/6 of the largest dimension of the character. Such a tolerance makes it possible to apply to this type of grid, automatic rapid reading by a detector moving across the grid in one direction without stoppage or precise adjustment of the grid image provided by the topological properties of this grid being detected and described hereafter and illustrated by the representative detector signal counts of Table 1.

In fact, this grid composed of seven segments could represent 128 possible characters, including a blank character. Where the method of reading consists of identifying each character by three numbers are shown in Table I, which represent the detection of intersections between the detector trajectories $a,b,c$ and the corresponding segments of the grid (FIG. 1), it is thus possible to identify only $(2+1)(3+1)(2+1) = 36$ characters out of the 128 which can be inscribed.

TABLE 1

| Characters | Character detection | | | Character complement detection | | | Ambiguity of read-in |
|---|---|---|---|---|---|---|---|
| | a | b | c | $\bar{a}$ (a+$\bar{a}$=2) | $\bar{b}$ (b+$\bar{b}$ = 3) | $\bar{c}$ (c+$\bar{c}$ = 2) | |
| Figures | | | | | | | |
| 0 | 2 | 2 | 2 | 0 | 1 | 0 | |
| 1 / 1 | 0 | 1 | 1 | 2 | 2 | 1 | |
| 2 / 2 | 1 | 1 | 0 | 1 | 2 | 2 | |
| 3 / 3 | 2 | 1 | 2 | 0 | 2 | 0 | |
| 4 / 4 | 1 | 2 | 2 | 1 | 1 | 0 | |
| | 0 | 3 | 1 | 2 | 0 | 1 | ← ← |
| 5 | 0 | 3 | 0 | 2 | 0 | 2 | |
| | 1 | 3 | 1 | 1 | 0 | 1 | |
| 6 / 6 | 2 | 3 | 0 | 0 | 0 | 2 | ← |
| 7 / 7 | 2 | 3 | 1 | 0 | 0 | 1 | ↑ |
| | 0 | 1 | 2 | 2 | 2 | 0 | |
| 8 | 0 | 2 | 2 | 2 | 1 | 0 | |
| | 2 | 3 | 2 | 0 | 0 | 0 | |
| 9 / 9 | 0 | 3 | 2 | 2 | 0 | 0 | |
| | 1 | 3 | 2 | 1 | 0 | 0 | |
| Letters | | | | | | | |
| C | 2 | 1 | 1 | 0 | 2 | 1 | |
| d | 2 | 2 | 1 | 0 | 1 | 1 | ← |
| E | 2 | 2 | 1 | 0 | 1 | 1 | ↑ |
| F | 1 | 2 | 1 | 1 | 1 | 1 | ↓ |
| H | 1 | 3 | 1 | 1 | 0 | 1 | ← |
| J | 1 | 1 | 1 | 1 | 2 | 1 | |
| L | 2 | 1 | 0 | 0 | 2 | 2 | |
| P | 1 | 2 | 2 | 1 | 1 | 0 | |
| E | 2 | 2 | 0 | 0 | 1 | 2 | |
| U | 2 | 2 | 1 | 0 | 1 | 1 | |
| Other signs | | | | | | | |
| - etc. | 0 | 1 | 0 | 2 | 2 | 2 | |

As shown in Table I, an identification of this type can be carried out without ambiguity solely for the numbers 0 to 9 with a variation for five of them; this identification may also be carried out without ambiguity for eight letters and only six letters of them with the figures. There thus remain fifteen other more or less representative signs, which can be distinguished from the 36 characters identifiable from the 128 which can be inscribed.

To understand the preceding explanation, it is not necessary to further explain the Table I to which reference is made, reading the latter and making a comparative analysis of its data is sufficient for this. However, it is important to note that reading of the characters may be achieved without ambiguity, either by detecting the segments actually composing each character (left-hand half of the Table), or by detecting the complementary segments, i.e. those which exist in the corresponding grid when the segments intended to compose the character have been selected.

From now on, the method of reading an isolated character may be clearly defined with reference to FIG. 1. It is sufficient that the reading direction L is inclined with respect to the two main significant directions M.1 and M.2 of the grid 1, M. 1 being a direction generally parallel to the small sides AD and BC of the grid, whereas M.2 is a direction generally parallel to the large sides AB and CD of this grid.

Naturally, in the particular case where the grid 2 (FIG. 6) is formed as a parallelogram, the directions M.1 and M.2 coincide with those of the small sides and large sides respectively of this parallelogram.

In the various embodiments of the method for reading a chain of characters, described hereafter with reference to FIGS. 2 to 4, characters are inscribed in grids 2 which are in the form of a parallelogram.

When it is a question of reading a chain of characters carried on a support or implement 6 which might include an envelope, cheque, label, invoice or the like, other significant directions are to be taken into consideration, since depending on the embodiment of the method chosen, they make it possible to define the configuration and orientation of the writing, as well as the scanning method to be adopted for the reading heads.

The directions to be considered are as follows (FIGS. 2 to 4):

The two main directions M.1 and M.2 of the grids,
the direction of automatic reading L,
a writing direction E which corresponds to the alignment of the characters one behind the other and
a reference direction R of the writing support 6, this reference direction being materialized on the support as, for example able to that of the edge or other guideline or surface of the envelope, cheque or the like.

In the prior art mentioned in the preamble, the reading direction L is parallel to the three other directions E, R and M.1. Now, as appears from the description of the grids 1 or 2 and the explanation of their properties from the point of view of detection, in order that the automatic reading may be carried out in a simple, reliable and economic manner, it is necessary that the reading direction L be inclined with respect to the main directions M.1 and M.2 of the grids constituting the chain.

Various ways of carrying out the method using this characteristic are described hereafter, with reference to FIGS. 2 to 4.

According to a first embodiment illustrated by FIG. 2, the reference direction R, writing direction E and motif direction M.1 are parallel. One thus obtains a conventional line of writing.

If the spacing of the characters is sufficiently large and in any case greater than twice the size described hereafter, the detection of each character is carried out, as shown in FIG. 1, by three reading heads each traversing and generating signals responsive to grid segments located within one of the three channels 3, 4 and 5. Thus, a first set of reading heads for example, heads a.1, b.1 and c.1 (not shown) detect the first character a second set of heads, a.2, b.2 and c.2 (not shown) the second characters - - - , and a.n, b.n and c.n the $n^{th}$ character in a chain. Naturally, the spacing between characters of a chain should be known in advance by the decoding machine (not shown) which identifies each character in a known way from the particular grid segment counts obtained by the detector and tabulated in Table 1.

But, if the spacing of the characters is chosen appropriately, as shown in FIG. 2, the number of reading heads may be reduced. In fact, if the spacing "p" of the characters is equal to $4d/\sin e$, $e$ being the angle formed by the directions E and L, the third reading trajectory c.n of a character of row n will coincide with the first reading trajectory $a.n + 1$ of the following character of row $n+1$. Thus, the reading heads moving along the a.(1...n), trajectories make it possible to detect the segments of two adjacent characters located in the same reading channel. However, it is necessary to be able to distinguish between signals emitted by each head moving along an a.(1...n), trajectory those which belong to the upstream character of row n and which would be detected in channel 5.$n$, from those which belong to the downstream character of row $n+1$ and which would be detected in the channel 3.$n+1$, it being understood that the channels 5.$n$ and 3.$n+1$ are common. To this end, a reference 7 is placed at the mid-height of the line and is able to be detected by an additional reading head moving along the trajectory a.o. Under these conditions, the reading of a line of writing comprising N characters may be carried out by means of $2(N+1)$ reading heads, in place of 3N reading heads as in the preceding case.

According to a second embodiment illustrated by FIG. 3, the writing direction E and reading direction L are parallel, but inclined with respect to the reference direction R and motif direction M.1, M.2, the directions R and M.1 also being parallel. One thus obtains a line of writing extending obliquely on the support 6, but remaining perfectly legible for the writer. In this case, three reading heads are sufficient, since by travelling along the lines a, b, c common to all the characters, they have the possibility of detecting the latter in succession. Naturally, depending on the decoding system used in the machine, references for the beginning and end of the line or characters may be necessary and they are thus detected by reading heads which may, in certain cases, be those which travel along the lines a, b, c.

According to a third embodiment of the method illustrated by FIG. 4, the writing direction E, reading direction L and reference direction R are parallel, but the main directions M. 1 and M.2 of the grids are inclined with respect to the preceding directions. One thus obtains an interesting configuration, since it makes it possible to read with only three heads, by moving the support parallel to its longitudinal edge. The remarks made for the detection with respect to the second embodiment clearly remain valid for this case.

However, the appearance of this writing is unusual and may lead the writer astray. In fact, experience shows that apprenticeship is very rapid and that it may be facilitated if the document to be coded comprises an illustrative sample of the characters used for this document.

Furthermore, it is beneficial to make the characters appear to be erect in order that they become perfectly comprehensible. This result may be obtained by means of an optical decoy, such as a series of parallel lines or bands 15, printed on a portion of the support 6 close to the location of the message to be composed. An example of this is given in FIG. 5. In this embodiment each of the grids 2 is postured so that its main direction M.1 is aligned parallel to the bands 15. Therefore, with respect to the bands 15, the grids 2 are erect. Accordingly, it is easier for the writer to inscribe a properly oriented character over the selected grid segments.

Naturally, in this third embodiment, it is possible to envisage a symmetrical configuration of the grids, in the sense that the characters, instead of being tilted towards the left, would be tilted towards the right. In reality, this variation is less advantageous, since for certain numerals, it leads to reading ambiguities.

In other words, it is important for unambiguous identification of the arabic numerals that the point A (FIGS. 1 and 4) of the quadrilateral or parallelogram forming the grid appears before i.e., upstream with respect to the reading direction, the point C, if one normally writes the line in the direction of arrow F (FIG. 4). Thus one of the reading heads traverses the two grid segments 16 and 17, shown in FIG. 4, for example, which constitute or define the upper right corner of a grid bearing the number legibly oriented.

The various ways of carrying out the aforementioned method are preferably applicable to hand writing. But they are also suitable for any composition which is typewritten, printed or produced by any reproduction means, provided that the characteristics explained are respected.

Furthermore, the chains of characters illustrated and described may preferably be read by a machine designed specifically and which has the advantage of being simple, reliable, safe and above all economical to produce and use.

The following explanation now proposes to define the additional characteristics of the method when it is a question of using the latter in the particular field of hand writing.

According to a first embodiment of the method adapted for a handwritten composition (FIG. 6), each grid 2 is drawn, by impression for example, on the support 6 in order to accurately define the contour of each of the segments which compose the latter. Preferably, this grid is engraved to form grooves 8 materializing the segments and serving as a guide for a tracer used by the writer.

In this first embodiment, the grids 2 of the chain are previously coated with a deposit of optically active material 9 and in particular acting by selective reflectivity, by luminescence or fluorescence. Advantageously, this material has a slight contrast to the background of the support in order that it is easily visible for the writer and that the latter is easily able to distinguish the impression which he makes in each grid with the shape corresponding directly to the character chosen. For this purpose, the writer uses any tracer, such as a pencil, ball point pen, felt pen etc. and with this tracer follows the selected segments, being guided, if the latter are engraved, in the grooves which materialize the latter. The material 10 deposited by this tracer covers the optically active material. Under these conditions, the reading heads detect the parts of the grids complementing the covered parts defining the characters, this detection being registerable in coded form as illustrated by the three right-hand columns of table I.

According to a second embodiment of the method adapted for a hand written composition (FIG. 7), the support 6 is covered by a detachable transfer sheet 11. The chain of grids 2 is traced and preferably engraved on the front side of the sheet 11, whereof the reverse side is previously covered with an optically active pressure transferable material 12 having a sufficient contrast with the background of the support to be distinguishable, after transfer, by the writer.

To inscribe the message, this writer thus uses a tracer of the same type as previously in order to leave an impression on the front side of the sheet 11. This tracer may also be a simple probe, since it is a question of pressing with the tracer to transfer the material 12 from the rear side of the sheet 11 to the support 6, at the location of the writing.

Under these conditions, the message appears directly on the support 6 and, after having detached the sheet 11, the reading heads may detect the grid segments forming the characters as set forth in coded form in the three left-hand columns of the Table I.

According to a variation, the optically active material 12 is replaced by a magnetically active material.

In both cases, it is possible to render the document such that it cannot be falsified, in the following manner. The support is coated with a photosensitive material and developer. The active material 12 deposited on the rear side of the transfer sheet 11 is mixed with a dry fixing agent. Under these conditions, when the writer transfers the active material to the support, at the same time, he fixes the photo-sensitive material at the location of the characters. When he then detaches the sheet 11, he exposes to the light the remaining photo-sensitive material of the support, which darkens. The characters consequently appear on a black background.

According to a third embodiment of the method adapted to a handwritten composition (FIG. 8), the support 6 is covered with a detachable transfer sheet 11. A first chain of grids 22a is drawn and preferably engraved on the front side of the sheet 11, whereof the rear side is coated with a masking material 13. A second chain of grids 2b is simply drawn opposite the first, on the support 6. The segments of these grids 2b are coated with a detectable active material 14, which may be an optically active material of the type above-mentioned, or even a magnetically active material. As in the second embodiment, the writer uses a tracer either leaving or not leaving an impression on the sheet 11. The pressure exerted by this tracer along the segments of the grids 2a has the effect of transferring the masking material 13 to the active material 14 of the corresponding segments of the grids 2b of the support. One thus returns to the composition of the first embodiment, but this time by transfer. Consequently, the reading heads detect the segments which are not masked, in the manner indicated on the right-hand half of the table I.

According to a variation of the third embodiment (FIG. 8), the detectable active material deposited on the grids 2b of the support 6 is covered with a photosensitive material and developer, which may also be spread beyond. The rear side of the sheet 11 is coated, no longer with a masking material 13, but with a dry fixing agent.

Under these conditions, when the writer composes on the transfer sheet 11 by pressing on the tracer, he mixes the fixing agent with the photo-sensitive material located in the selected segments by tracing the grids 2a and 2b. The writer then detaches the sheet 11 and thus exposes to the light the photosensitive material which is not fixed which, consequently, darkens and covers the untraced segments. The reading heads directly detect the marked characters as indicated on the left-hand side of the Table I. The major advantage of this variation resides in the fact that the documents are very difficult to forge.

The invention is not limited to the embodiments illustrated and described in the preceding, since various modifications may be applied thereto without diverging from its framework.

The method, which is the object of the invention may be applied to the idea, production and automatic reading of writing, more specifically when the latter is hand written. It also relates to a teaching for simplification of machines for reading shapes. It also enables the user to complete any of the various documents such as envelopes for letters, cheques, invoices, statements etc., personally and with any tracing member.

What is claimed is:

1. In a method of decoding information formed of detectable material characterizing segmentally stylized information displays each of which is patterned on a pair of adjacent quadrilateral configurations and aligned on the surface of a support one behind the other in a predetermined direction, the improvement comprising the steps of sequentially traversing each display with a detector responsive to the detectable material within each of three parallel sampling channels defined by and delimiting the display segments such that one of said channels bounds only those segments which would determine the upper right corner of a display presenting the information legibly.

2. The method of claim 1 in which said channels are simultaneously passed by the detector conveyed continuously in only one sampling direction across the support.

3. The method of claim 2 comprising in addition the steps of generating a signal for each detected segment, registering the signals and counting the signals to enable identification of the information.

4. Method according to claim 2, in which the spacing of the displays is equal to the ratio of twice the width of each channel, over the side of the angle formed by the one direction with the predetermined direction, such that one channel of a display coincides with one channel of the following display and the detection of a line of displays is carried out by two times more detectors + 1, than this line comprises displays, these detectors moving along during a single passage in the corresponding channels, and comprising the additional step of detecting a reference placed at the mid height of said line in order to distinguish information relating to one display from that which relates to the following display.

5. Method according to claim 2, in which for each display presenting information legibly oriented the angle formed by the short upper segment with the two aligned segments on the left-hand side is passed by the detector before the angle formed by the lower short segment with the two aligned segments on the left-hand side.

6. Method according to claim 1 in which each of said channels is parallel to a diagonal of the elementary quadrilateral defined by four segments such that the detection of all the segments may be obtained by moving the detector along during a single passage in each of the channels bounded by four straight lines parallel and equidistant, passing through all the intersection points of the segments.

7. A support element for conveying encoded information formed of detectable material in presentable form for automatic decoding, comprising a surface characterized by a plurality of segmentally stylized displays each of which is patterned on a pair of adjacent quadrilateral configurations the segments of which constitute a grid defining three parallel sampling channels delimiting all of said segments therein such that one of said channels bounds only those segments which would determine the upper right corner of a grid oriented to present the information legibly, the displays being aligned on said surface one behind the other such that selected segments of a pair of adjacent grids are inscribed within said one channel of at least one grid of said pair, the detectable material being applied to overlie said grid segments to define the encoded information.

8. The element of claim 7 in which segments defining both the upper right and lower left corners, respectively, of adjacent grids oriented to present the information legibly are delimited by said one channel.

9. The element of claim 7 in which the displays are aligned such that each of said channels is common to all of the grids.

10. The element of claim 9 comprising a detectable formation defining a reference direction, the displays being aligned substantially parallel thereto.

11. The element of claim 7 comprising an impression in said surface defining each of said grid segments, each impression being such that a writing device is guidable thereby to define the detectable display on the surface of the support.

12. The element of claim 7 in which the support element comprises a substrate and a multi-layer foil bearing said displays and releasably secured to and overlying the substrate, the inner layer of said foil being transferable to the substrate under pressure.

13. The element of claim 12 in which the pressure transferable material comprises the detectable material.

14. The element of claim 12 in which the substrate bears a detectable impression of said displays and the transferable layer comprises a masking material selectively to cover the grid segments to prevent their detection.

15. The element of claim 12 in which the substrate comprises in addition a covering layer of photosensitive material.

16. The element of claim 7 in which the detectable material is optically detectable.

17. The element of claim 7 in which the detectable material is magnetically detectable.

18. Apparatus for decoding information formed of detectable material characterizing the surface of the support of claim 7, comprising,
   a multi-head segment detector responsive to the detectable material to produce code signals and having at least one head for each of the sampling channels;
   means for orienting the support relative to the detector for relative movement therebetween such that each of the detector heads traverses a display within one of said channels in a continuous one way trajectory;
   means for registering the signals; and
   means for counting the signals to enable identification of the information of the information encoded on the support.

* * * * *

UNITED STATES PATENT OFFICE
CERTIFICATE OF CORRECTION

Patent No. 4,081,791   Dated March 28, 1978

Inventor(s) Jean Pollard and Pierre Pollard

It is certified that error appears in the above-identified patent and that said Letters Patent are hereby corrected as shown below:

Col. 1, line 32, insert a comma after "speed" and delete the comma after "and".
Col. 1, line 42, change "de-centralized" to --decentralized--.
Col. 2, line 5, change "A" to --a--.
Col. 2, line 9, after "apprenticeship" insert a semicolon.
Col. 2, line 17, after "segment" insert --grid--.
Col. 2, lines 59 and 60, change "preproduceability" to --reproduceability--.
Col. 3, line 17, after "2d;" insert --any--.
Col. 3, line 58, change "o" to --to--.
Col. 4, line 15, change "are" to --as--.
Col. 5, line 38, delete "able to that of".
Col. 5, line 64, after "character" insert a comma.
Col. 8, line 32, change "22a" to --2a--.
Col. 9, line 20, change "steps" to --step--.
Col. 9, line 53, after "two" insert --said--.
Col. 10, line 23, after "aligned" insert --in a direction--.

Signed and Sealed this

Nineteenth Day of September 1978

[SEAL]

Attest:

RUTH C. MASON
Attesting Officer

DONALD W. BANNER
Commissioner of Patents and Trademarks